United States Patent
Park et al.

(10) Patent No.: US 6,956,863 B2
(45) Date of Patent: Oct. 18, 2005

(54) APPARATUS AND METHOD FOR ALLOCATING CHANNEL BETWEEN MSC AND IWF UNIT IN CDMA MOBILE COMMUNICATION SYSTEM

(75) Inventors: Sang-Ho Park, Ichon-shi (KR); Geun-Jik Chai, Ichon-shi (KR); Yong-Oh Kang, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 860 days.

(21) Appl. No.: 09/843,355

(22) Filed: Apr. 26, 2001

(65) Prior Publication Data

US 2001/0036166 A1 Nov. 1, 2001

(30) Foreign Application Priority Data

Apr. 28, 2000 (KR) ........................................ 2000-22886

(51) Int. Cl.[7] .............................. H04L 12/28; H04J 3/16
(52) U.S. Cl. ........................................ 370/431; 370/465
(58) Field of Search ................................ 370/420, 431, 370/328, 329, 341, 337, 465, 468, 498, 335, 342, 441

(56) References Cited

U.S. PATENT DOCUMENTS

| | | | |
|---|---|---|---|
| 5,671,223 A | 9/1997 | Shachar et al. | 370/395 |
| 5,721,726 A | 2/1998 | Kurnick et al. | 370/236 |
| 6,052,365 A * | 4/2000 | Bhagalia et al. | 370/336 |
| 6,115,390 A | 9/2000 | Chuah | 370/443 |
| 6,353,605 B1 * | 3/2002 | Rautanen et al. | 370/337 |
| 6,636,492 B1 * | 10/2003 | Son et al. | 370/329 |
| 6,646,998 B1 * | 11/2003 | Rasanen | 370/328 |
| 2001/0004599 A1 * | 6/2001 | Dokko | 455/452 |

* cited by examiner

Primary Examiner—Andy Lee
(74) Attorney, Agent, or Firm—McDonnell Boehnen Hulbert & Berghoff LLP

(57) ABSTRACT

A device and method are provided for allocating an E1 channel between a mobile switching center ("MSC") and an interworking function ("IWF ") unit in a CDMA mobile communication system are provided. The method results in an E1 super channel being variably allocated to support both IS-95A service for low speed calls and IS95B service for high speed calls.

5 Claims, 5 Drawing Sheets

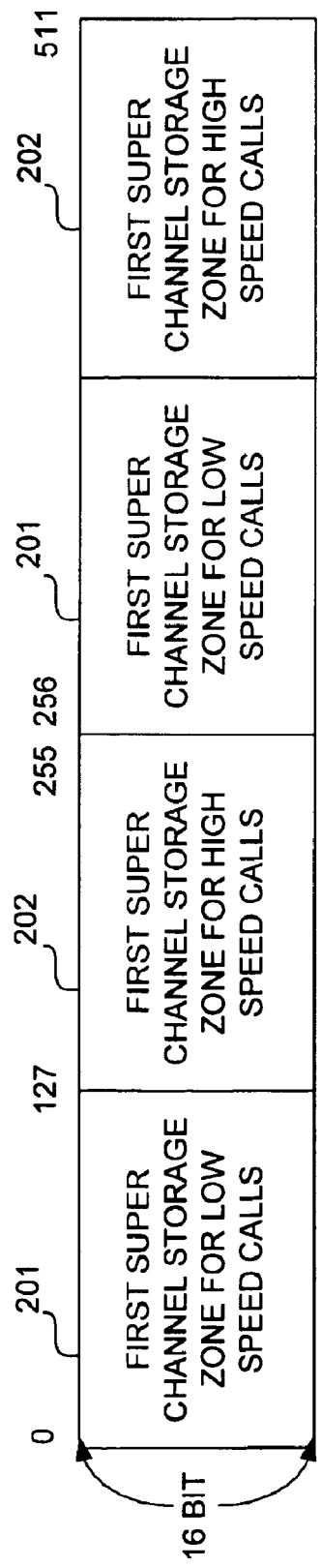
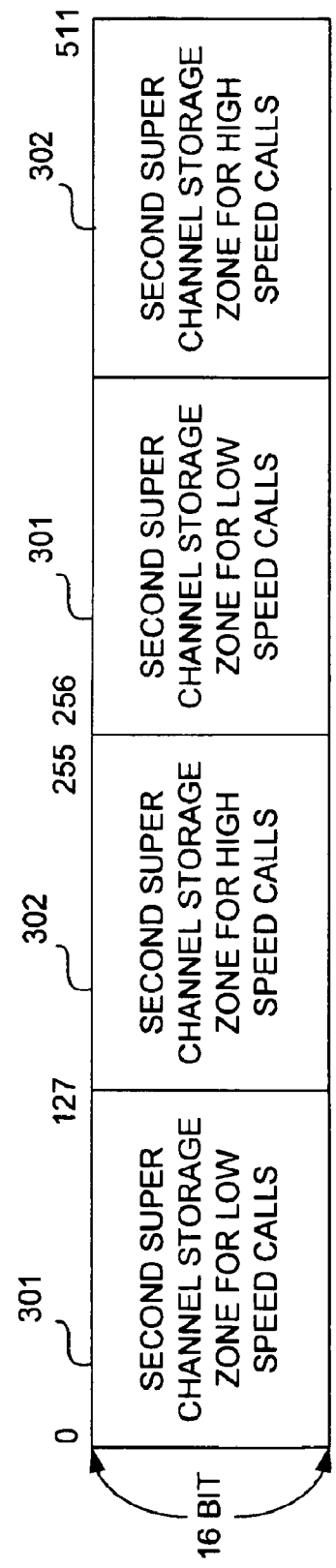
FIG. 2A
FIG. 2B

APPARATUS AND METHOD FOR ALLOCATING CHANNEL BETWEEN MSC AND IWF UNIT IN CDMA MOBILE COMMUNICATION SYSTEM

FIELD OF INVENTION

This invention relates to a device and method for allocating a channel in a code division multiple access ("CDMA") mobile communication system; and more particularly, to a device and method for allocating an E1 channel between a mobile switching center ("MSC") and an interworking function ("IWF") unit in a CDMA mobile communication system.

DESCRIPTION OF THE PRIOR ART

Code division multiple access ("CDMA") radio data service currently in service is provided based on the IS-95A standard that supports low speed (8/13 Kbps) data service. CDMA radio data service based on the IS-95B standard is provided at higher speed (64 Kbps), enabling more data to be processed during a predetermined period time.

Currently, in order to allocate a channel between a mobile switching center ("MSC") and an interworking function ("IWF") unit, an E1 channel allocation method, which assumes 5 channels to be one super channel, is employed. The E1 channel allocation method is suitable for low speed data service, which, as mentioned above is based on the IS-95A standard. However in cases where this allocation method is applied to high speed data service based on the IS-95B standard, calls are frequently disconnected during call processing, thereby reducing the quality of service. Calls are disconnected due to congestion caused by an increase in the quantity of data that is to be processed at the same time.

SUMMARY OF THE INVENTION

It is an object of the present invention to provide an apparatus and method for allocating an E1 channel between an MSC and an IWF unit in CDMA mobile communication system, wherein an E1 super channel can be variably allocated to support both the IS-95A service for low speed calls and the IS-95B service for high speed calls.

In accordance with an aspect of the present invention, there is provided an apparatus for allocating an E1 channel between an MSC and an IWF unit in a CDMA mobile communication system, the apparatus including a channel buffer for receiving and storing call processing data; a transmission routing serial interface random access memory ("SI RAM") for storing the E1 channel allocation information; a CPM for reading out the call processing data that are stored in the channel buffer, storing received call processing data in the channel buffer, determining whether there are more high speed calls or low speed calls in a plurality of call types currently being processed and modifying the E1 channel allocation information stored in each of the transmission routing SI RAM and the reception routing SI RAM; a multi channel controlling unit for reading out the E1 channel allocation information stored in each of the transmission routing SI RAM and the reception routing SI RAM and allocating a super channel made up of 5 channels or a super channel made up of 10 channels to the E1 channel; and a serial-parallel converting unit for converting the call processing data from the CPM to serial data and then transmitting the serial data to the IWF unit; and converting the call processing data from the IWF unit to parallel data and then transmitting the parallel data to the CPM.

In accordance with another aspect of the present invention, there is provided a method for allocating an E1 channel between an MSC and an IWF unit in a CDMA mobile communication system, the method including the steps of: by a CPM, receiving from the high-level processor call type information about a plurality of call types currently being processed; by the CPM, determining, based on the call type information, whether there are more high speed calls or low speed calls in the plurality of call types currently being processed, if there are more high speed calls in the plurality of call types currently being processed, then the CPM designates first/second super channel storage space for high speed calls of each transmission/reception routing SI RAM as an active zone and first/second super channel storage space for low speed calls of each transmission/reception routing SI RAM as a shadow zone; and by a multi channel controlling unit, reading the E1 channel allocation information that is stored in each of the first/second super channel storage space for high speed calls and allocating a super channel made up of 10 channels for high speed calls to the E1 channel; if there are more low speed calls in the plurality of call types currently being processed, then the CPM designates first/second super channel storage space for low speed calls of each transmission/reception routing SI RAM as the active zone and first/second super channel storage space for high speed calls of each transmission/reception routing SI RAM as the shadow zone; and by the multi channel controlling unit, reading the E1 channel allocation information that is stored in each of the first/second super channel storage space for low speed calls and allocating a super channel made up of 5 channels for low speed calls to the E1 channel.

BRIEF DESCRIPTION OF THE DRAWINGS

Other aspects and advantages of the invention will become apparent from the following description of various embodiments, with reference, where appropriate, to the accompanying drawings, in which:

FIG. 2A is a configuration of a transmission routing SI RAM included in an apparatus for allocating an E1 channel between an MSC and an IWF unit in a CDMA mobile communication system in accordance with the present invention;

FIG. 2B is a configuration of a reception routing SI RAM included in an apparatus for allocating an E1 channel between an MSC and an IWF unit in a CDMA mobile communication system in accordance with the present invention;

DETAILED DESCRIPTION OF PREFERRED EMBODIMENTS

Figure 1:
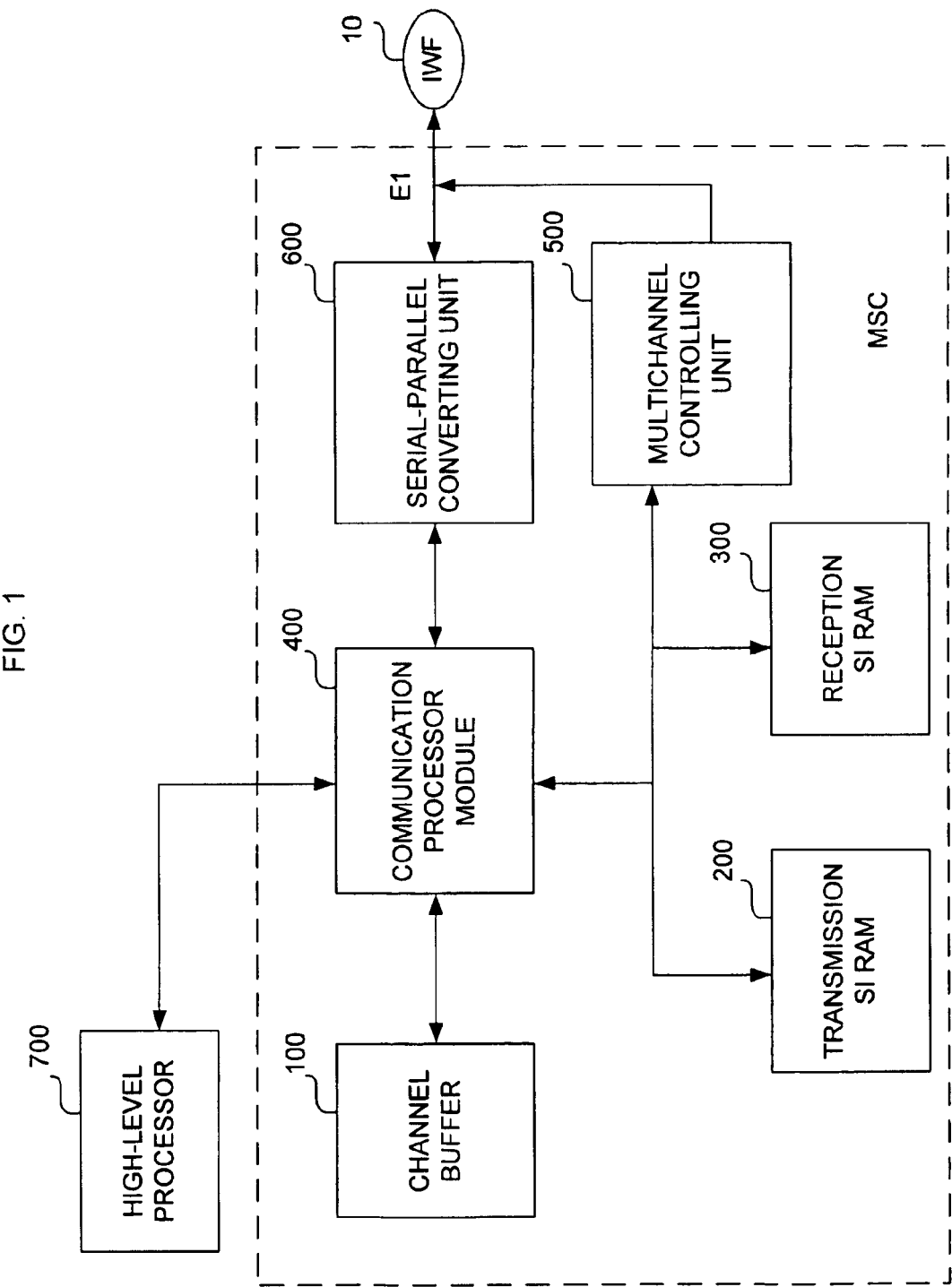
FIG. 1 is a block diagram illustrating an apparatus for allocating an E1 channel between an MSC and an IWF unit in a CDMA mobile communication system in accordance with the present invention.

FIG. 1 is a block diagram illustrating an apparatus for allocating an E1 channel between an MSC and an IWF unit in a CDMA system in accordance with the present invention.

The apparatus for allocating the E1 channel between the MSC and the IWF unit in the CDMA system can be embodied using an "MPC8260" chip architected by MOTOROLA®.

The apparatus includes a channel buffer 100, a transmission routing serial interface random access memory ("SI RAM") 200, a reception routing SI RAM 300, a communication processor module ("CPM") 400, a multi channel controlling unit 500 and a serial-parallel converting unit 600.

The channel buffer 100 receives call-processing data that is transmitted from a high-level processor and stores the same therein. The channel buffer 100 also receives and stores call-processing data that is transmitted from the CPM 400.

FIG. 2A shows the transmission routing SI RAM 200. The transmission routing SI RAM 200 is a routing table wherein a 16 bit entry is represented as a bit or byte unit on a basis of one E1 and where E1 channel allocation information is stored. The E1 channel allocation information is information pertaining to whether a transmission super channel made up of 5 channels or a transmission super channel made up of 10 channels will be employed when call processing data is transmitted to an IWF unit 10. As shown in FIG. 2A, the transmission routing SI RAM 200 includes a first super channel storage zone for low speed calls 201 and a first super channel storage zone for high speed calls 202.

The first super channel storage zone for low speed calls 201 stores the E1 channel allocation information about the transmission super channel made up of 5 channels.

The first super channel storage zone for high speed calls 202 stores the E1 channel allocation information about the transmission super channel made up of 10 channels.

Referring to FIG. 2B, the reception routing SI RAM 300 is a routing table wherein a 16 bit entry is represented as a bit or byte unit on a basis of one E1 and where E1 channel allocation information is stored. The E1 channel allocation information is information pertaining to whether a transmission super channel made up of 5 channels or a transmission super channel made up of 10 channels will be employed when call processing data is transmitted from the IWF unit 10. As shown in FIG. 2B, the reception routing SI RAM 300 includes a second super channel storage zone for low speed calls 301 and a second super channel storage zone for high speed calls 302.

The second super channel storage zone for low speed calls 301 stores the E1 channel allocation information about the reception super channel made up of 5 channels.

The second super channel storage zone for high speed calls 302 stores the E1 channel allocation information about the reception super channel made up of 10 channels.

Referring back to FIG. 1, a CPM 400 is shown. The CPM 400 reads out the call processing data that is stored in the channel buffer 100 and then transmits the same to the serial-parallel converting unit 600. When the CPM 400 receives call processing data from the serial-parallel converting unit 600, the CPM 400 stores the same in the channel buffer 100.

When the CPM 400 receives call type information about a plurality of call types from the high-level processor during a call setup procedure, the CPM 400 determines, based on the call type information, whether there are more high speed calls or low speed calls in the plurality of call types.

If there are more low speed calls, the CPM 400 modifies the E1 channel allocation information of the respective transmission/reception routing SI RAM 200/300 to employ the E1 channel allocation information with the super channel made up of 5 channels. On the other hand, if there are more high speed calls, the CPM 400 modifies the E1 channel allocation information of the transmission/reception routing SI RAM 200/300 to employ the E1 channel allocation information with the super channel made up of 10 channels.

The multi channel controlling unit 500 reads the E1 channel allocation information that is stored in the respective transmission/reception routing SI RAM 200/300 and then allocates the super channel made up of 5 channels for low speed calls or the super channel made up of 10 channels for high speed calls.

Upon receiving the call processing data from the CPM 400, the serial-parallel converting unit 600 converts the same to serial data and then transmits the serial data to the IWF unit 10 through a corresponding super channel. Also, upon receiving the call processing data from the IWF unit 10 through a corresponding super channel, the serial-parallel converting unit 600 converts the same to parallel data and then transmits the parallel data to the CPM 400.

Figure 3:
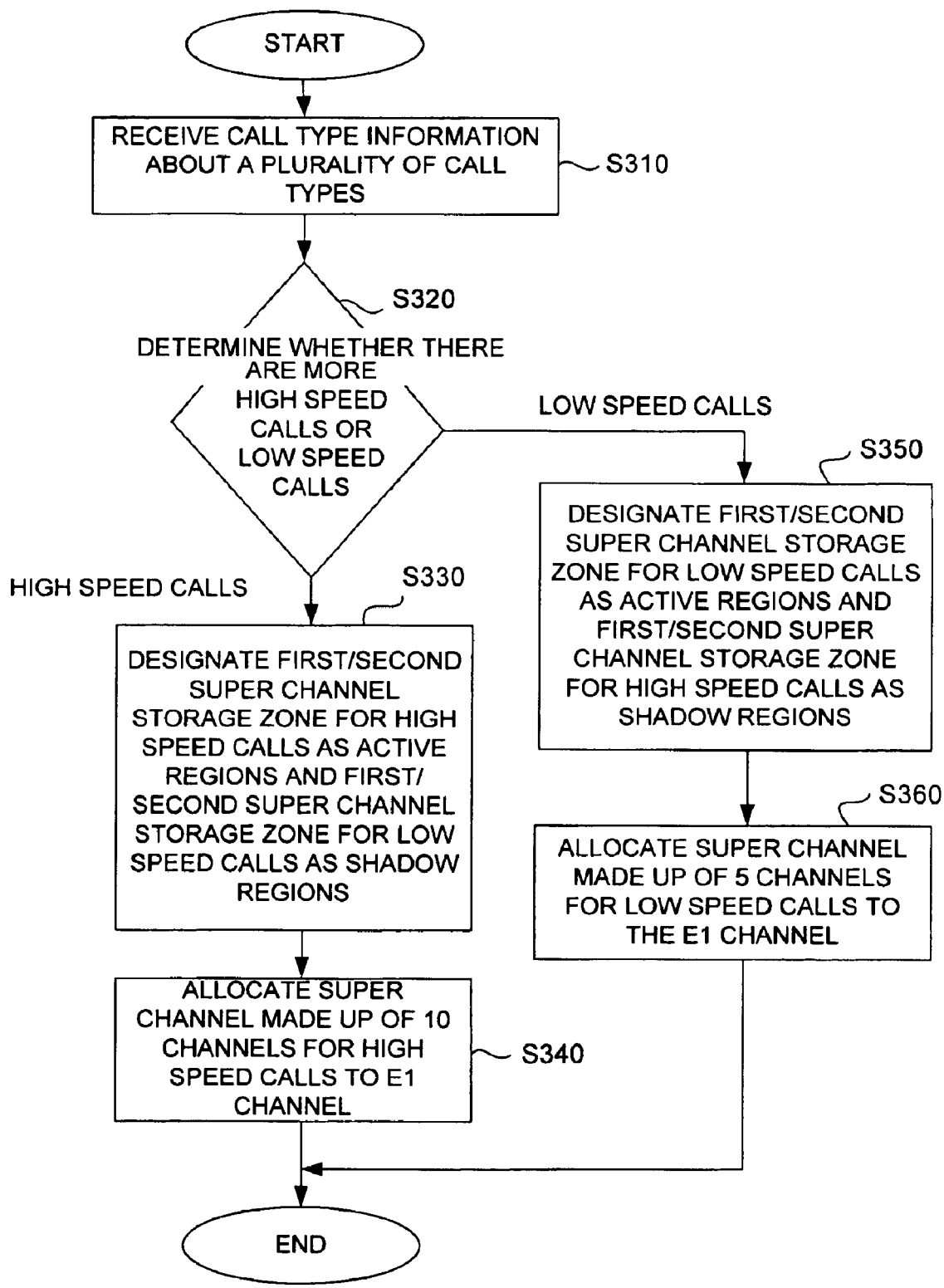
FIG. 3 is a flow chart illustrating a method for allocating an E1 channel between an MSC and an IWF unit in a CDMA mobile communication system in accordance with the present invention.

FIG. 3 is a flow chart illustrating a method for allocating an E I channel between a mobile switching center (MSC) and a IWF unit in a CDMA system in accordance with the present invention.

At step S310, the CPM 400 receives call type information about a plurality of call types in process currently from the high-level processor.

At step S320, the CPM 400 determines, based on the call type information, whether there are more high speed calls or low speed calls in the plurality of call types. The high speed calls may represent IS-95A service, provided at 8/13 Kbps data rate, and the low speed calls may represent IS-95B service, provided at 64 Kbps data rate.

As a result of the above determination, if there are more high speed calls in the plurality of call types being processed, then as shown at step S330, the CPM 400 may designate the first/second super channel storage zone for high speed calls 202/302 of the respective transmission/reception routing SI RAM 200/300 as active regions. The CPM 400 may also then designate the first/second super channel storage zone for low speed calls 201/301 of the respective transmission/reception routing SI RAM 200/300 as shadow regions.

Figure 4A:
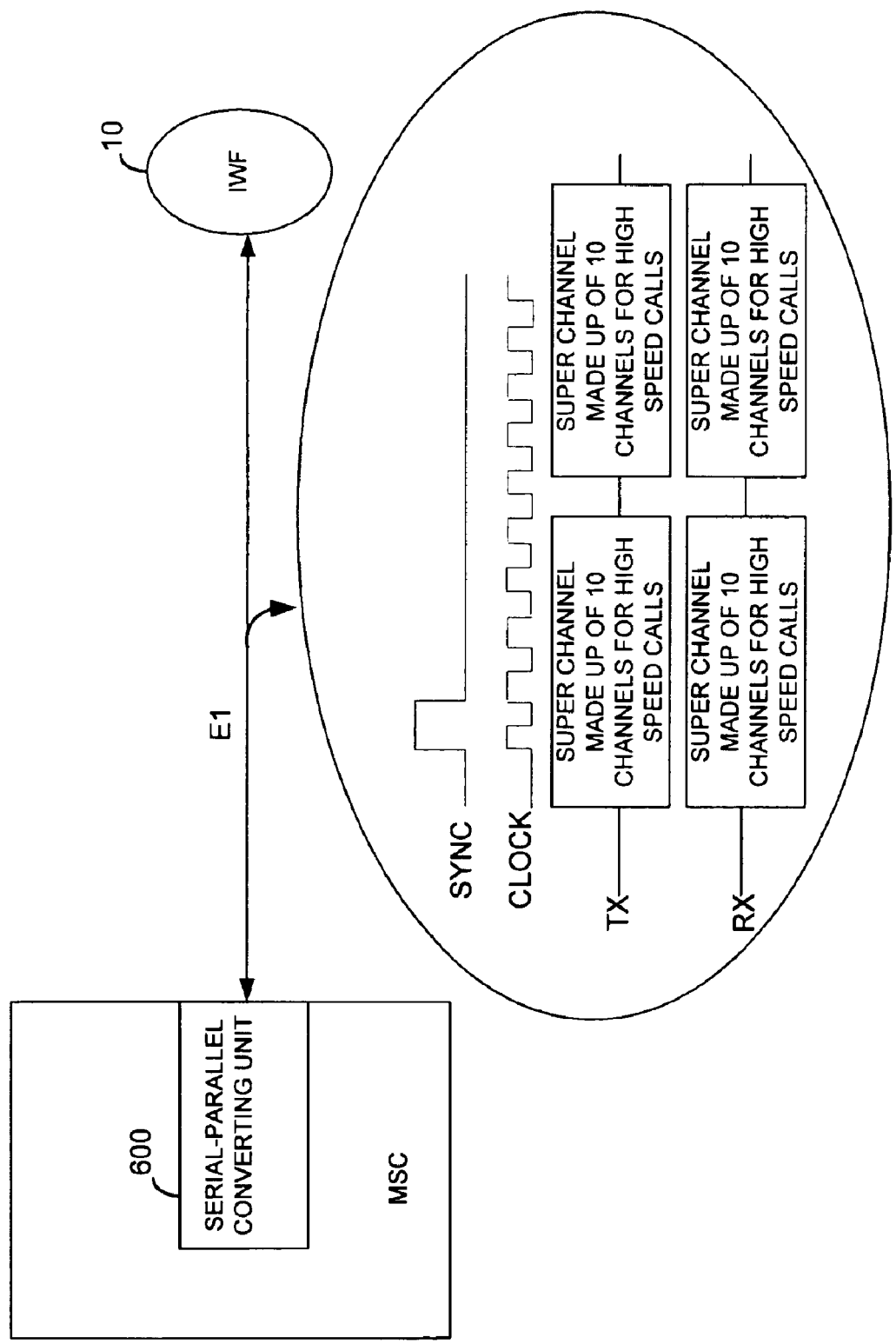
FIG. 4A shows a signal flow through a super channel for high speed calls between an MSC and an IWF unit in a CDMA mobile communication system in accordance with the present invention.

At step S340, the multi channel controlling unit 500 may read the E1 channel allocation information that is stored in each of first/second super channel storage zones for high speed calls 202/302 of the respective transmission/reception routing SI RAM 200/300 and may then allocate the super channel made up of 10 channels for high speed calls to the E1 channel. Accordingly, the call processing data may be transmitted between the MSC and the IWF unit through the super channel made up of 10 channels for high speed calls in the CDMA system, as further shown in FIG. 4A.

Alternatively, if there are more low speed calls in the plurality of call types being processed, then as shown at step S350, the CPM 400 may designate the first/second super channel storage zone for low speed calls 201/301 of the respective transmission/reception routing SI RAM 200/300 as active regions. The CPM may also then designate the first/second super channel storage zone for high speed calls 202/302 of the respective transmission/reception routing SI RAM 200/300 as shadow regions.

Figure 4B:
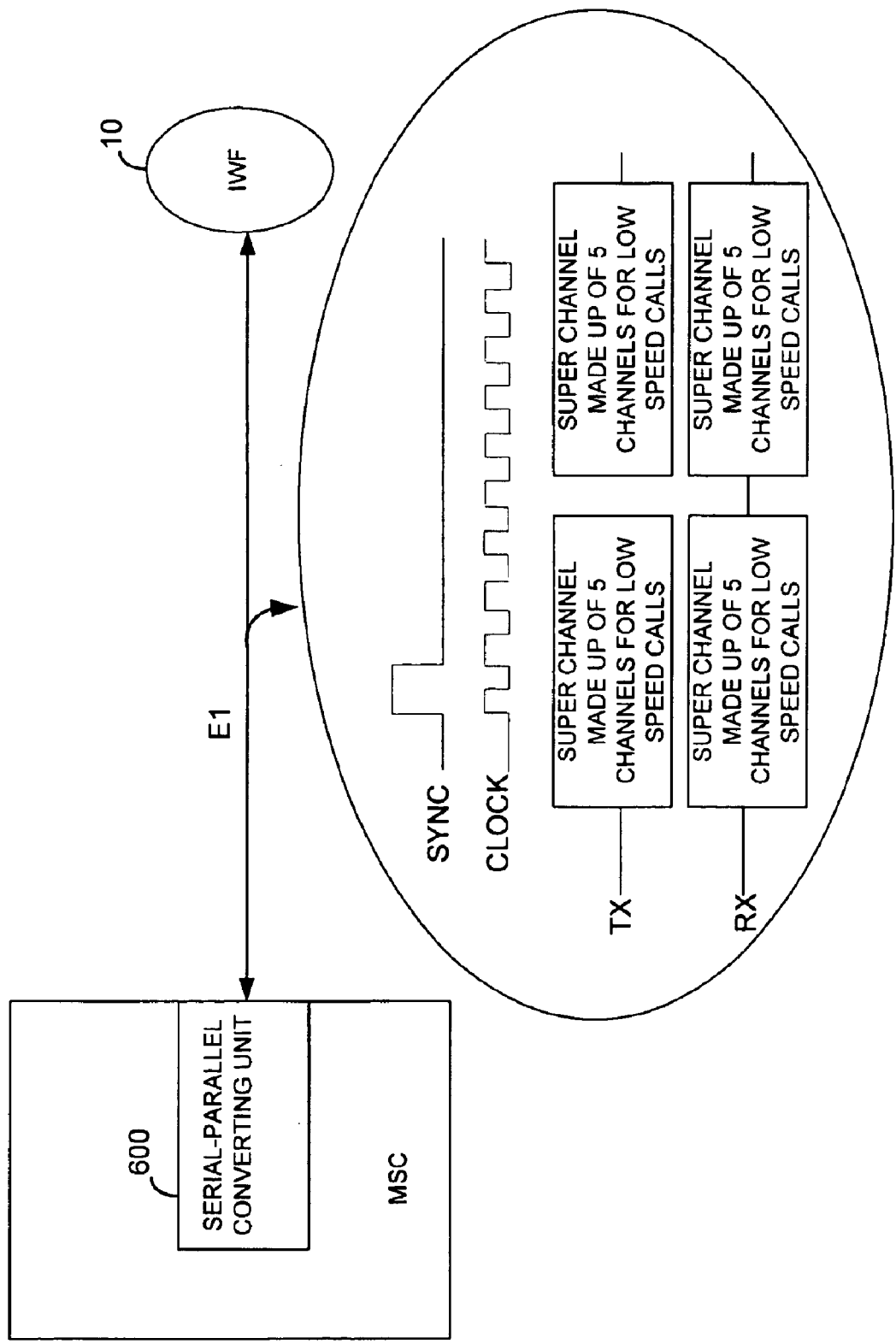
FIG. 4B shows a signal flow through a super channel for low speed calls between an MSC and an IWF unit in a CDMA mobile communication system in accordance with the present invention.

At step S360, the multi channel controlling unit 500 may read the E1 channel allocation information that is stored in each of first/second super channel storage zones for low speed calls 201/301 of the respective transmission/reception routing SI RAM 200/300 and then allocates the super channel made up of 5 channels for low speed calls to the E1 channel. Accordingly, the call processing data may then be transmitted between the MSC and the IWF unit through the super channel made up of 5 channels for low speed calls in the CDMA system, as shown in FIG. 4B.

By employing the above apparatus and method for allocating an E1 channel between the MSC and the IWF unit in the CDMA system in accordance with the present invention, the E1 channel can be variably allocated to support both the IS-95A and the IS-95B services provided respectively at low and high speeds, respectively.

What is claimed is:

1. An apparatus for allocating an E1 channel between a mobile switching center ("MSC") and an interworking function ("IWF") unit in code division multiple access ("CDMA") mobile communication system, the apparatus comprising:

a channel buffer for receiving and storing call processing data;

a transmission routing serial interface random access memory ("SI RAM") for storing E1 channel allocation information, wherein the E1 channel allocation information includes information on whether a transmission super channel made up of 5 channels will be employed or a transmission super channel made up of 10 channels will be employed in transmitting the call processing data to the IWF unit;

a reception SI RAM for storing the E1 channel allocation information, wherein the E1 channel allocation information further includes information on whether a reception super channel made up of 5 channels will be employed or a reception super channel made up of 10 channels will be employed in receiving the call processing data transmitted from the IWF unit;

communication processor module ("CPM") for reading the call processing data that is stored in the channel buffer, storing received call processing data in the channel buffer, determining whether there are more high speed calls or low speed calls in a plurality of call types currently being processed and modifying the E1 channel allocation information stored in each of the transmission SI RAM and the reception SI RAM;

a multi channel controlling unit for reading the E1 channel allocation information stored in each of the transmission routing SI RAM and the reception routing SI RAM and allocating a super channel made up of 5 channels for low speed calls or a super channel made up of 10 channels for high speed calls to the E1 channel; and a serial-parallel converting unit for converting the call processing data from the CPM to serial data, transmitting the serial data to the IWF unit through a corresponding super channel and converting the call processing data from the IWF unit through the corresponding super channel to parallel data and then transmitting the parallel data to the CPM.

2. The apparatus as recited in claim 1, wherein the transmission SI RAM includes:

a first super channel storage space for low speed calls operable to store the E1 channel allocation information about the transmission super channel made up of 5 channels; and a first super channel storage space for high speed calls operable to store the E1 channel allocation information about the transmission super channel made up of 10 channels.

3. The apparatus as recited in claim 1, wherein the reception SI RAM includes:

a second super channel storage space for low speed calls operable to store the E1 channel allocation information about the reception super channel made up of 5 channels; and a second super channel storage space for high speed calls operable to store the E1 channel allocation information about the reception super channel made up of 10 channels.

4. A method for allocating an E1 channel between a mobile switching center ("MSC") and an interworking function ("IWF") unit in a code division multiple access ("CDMA") mobile communication system, the method comprising the steps of:

a) by a communication processor module ("CPM"), receiving from the high-level processor call type information about a plurality of call types currently being processed;

b) by the CPM, determining, based on the call type information, whether there are more high speed calls or low speed calls in the plurality of call types currently being processed;

c) if there are more high speed calls in the plurality of call types currently being processed, then the CPM designates first/second supper channel storage space for high speed calls of each transmission/reception routing (serial interface random access memory) ("SI RAM") as an active zone and first/second super channel storage space for low speed calls of each transmission/reception routing SI RAM as a shadow zone; and d) by a multi channel controlling unit, reading the E1 channel allocation information that is stored in each of the first/second super channel storage spaces for high speed calls and allocating a super channel made up of 10 channels for high speed calls to the E1 channel.

5. The method as recited in claim 4, wherein step c) further includes the steps of:

e) if there are more low speed calls in the plurality of call types currently being processed, then the CPM designates first/second super channel storage space for low speed calls of each transmission/reception routing SI RAM as the active zone and first/second super channel storage space for high speed calls of each transmission/reception routing SI RAM as the shadow zone; and f) the multi channel controlling unit reading the E1 channel allocation information that is stored in each of the first/second super channel storage spaces for low speed calls and allocating a super channel made up of 5 channels for low speed calls to the E1 channel.

* * * * *